United States Patent Office 2,808,387
Patented Oct. 1, 1957

2,808,387

RIGID SHOCK-RESISTANT VINYL HALIDE POLYMER COMPOSITIONS AND METHOD OF MAKING SAME

Clarence E. Parks, Bay Village, and George L. Wheelock, Akron, Ohio, assignors to The B. F. Goodrich Company, New York, N. Y., a corporation of New York No Drawing. Application May 6, 1953,
Serial No. 353,446

10 Claims. (Cl. 260—45.5)

This invention relates to thermoplastic vinyl halide polymer compositions which possess excellent physical properties including high impact strength and shock resistance, and it relates particularly to hard, tough, rigid, but processable compositions comprising an intimate mixture of a vinyl halide polymer, a polymeric resinous processing aid compatible therewith, and a rubbery interpolymer.

In the copending application of Garland B. Jennings, Serial No. 211,984, filed February 20, 1951, now U. S. Patent 2,646,417, there is disclosed a new class of hard and rigid thermoplastic compositions which may be readily processed by conventional plastic processing techniques without added plasticizer. These compositions are blends of a vinyl halide polymer, such as polyvinyl chloride, with a hard resinous copolymer of styrene and acrylonitrile. These compositions, while they are tough and hard, are not as shock-resistant as is sometimes desirable in a hard, rigid, plastic composition or product. The use of certain rubbery materials in thermosetting resins, such as phenol-formaldehyde, to improve shock resistance, is well known; but when the rubbery materials ordinarily employed in such applications are mixed with the above-identified rigid, vinyl thermoplastic compositions, very inferior products are obtained. The processing characteristics of such a composition are poor, tack is increased, and the physical properties of the product in general are greatly harmed. For example, tensile strength, flexural strength, heat distortion point and the like are decreased to such a degree that useful products are not obtained.

It has been found that rigid, hard, tough vinyl halide polymer compositions may be prepared which have extremely high impact resistance and at the same time retain good processing characteristics, as well as the many advantages and good physical properties of an unplasticized halide polymer composition. These improved compositions are intimate mixtures of the vinyl halide polymer, a polymeric resinous polymer compatible therewith, such as a styreneacrylonitrile copolymer resin, and a rubbery interpolymer of a butadiene-1,3 hydrocarbon, an acrylonitrile and at least one other copolymerizable monoolefinic monomer. When these polymeric ingredients are intimately mixed, as will be hereinafter described, the rigid composition resulting is unusually and surprisingly shock-resistant, is readily processable and, quite unexpectedly, retains essentially all of the desirable properties of the original vinyl halide polymer virtually unimpaired and in good balance. The copending application of Clarence E. Parks and Garland B. Jennings, Serial No. 353,452, filed May 6, 1953, discloses that the addition of a polyvalent metal compound to this composition further increases the shock resistance of these compositions.

In accordance with this invention typical thermoplastic compositions are prepared, for example, by intimately blending, as by mastication and heat, about 100 weight parts of a vinyl halide polymer, such as polyvinyl chloride, with about 10 weight parts of a resinous styreneacrylonitrile copolymer, and about 10 weight parts of a rubbery interpolymer of 1,3-butadiene, acrylonitrile and styrene. The resulting composition has a tensile strength of about 5800 pounds per square inch, a flexural strength of about 11,000 pounds per square inch and an Izod impact value of about 9.5. The Izod impact value of a similar mixture of polyvinyl chloride with a styreneacrylonitrile copolymer is only about 0.5. The compositions of this invention have excellent processing characteristics, and they may be extruded, calendered, molded, drawn, embossed, machined and otherwise treated to form useful rigid shock-resistant products and articles which have an excellent balance of good chemical, physical and electrical properties.

The vinyl halide polymers which are utilized in preparing the compositions of this invention include all of the normally rigid, hard, tough polymeric materials comprised predominantly of polymerized vinyl halide, that is, homopolymers of the vinyl halides such as polyvinyl chloride, polyvinyl fluoride and polyvinyl bromide, as well as copolymers containing greater than 50 percent of bound vinyl halide and lesser amounts of other monoolefinic monomers. Multicomponent interpolymers made from monomer mixtures containing predominantly a vinyl halide monomer and minor amounts of one or more other copolymerizable monoolefinic monomers may also be employed so long as they are normally rigid copolymers. Such other copolymerizable monoolefinic monomers which may be interpolymerized with the vinyl halides include vinylidene halides such as vinylidene chloride; vinyl esters such as vinyl acetate, vinyl butyrate, vinyl benzoate and the like; acrylic and alpha-alkyl acrylic acids, their alkyl esters, amides and nitriles such as acrylic acid, ethacrylic acid, ethyl acrylate, octyl acrylate, methyl methacrylate, butyl ethacrylate, acrylamide, acrylonitrile and the like; vinyl aromatic compounds such as the styrenes including styrene, chlorostyrene, ethyl styrene and the like; vinyl naphthalene; alkyl esters of maleic and fumaric acid such as diethyl maleate; vinyl alkyl ethers and vinyl alkyl ketones; vinyl pyridine; isobutylene and various other copolymerizable monoolefinic monomers; especially those containing the $CH_2=C<$ group. The vinyl halide polymer preferably employed is polyvinyl chloride or vinyl chloride copolymers which contain only minor proportions of other copolymerized monoolefinic monomers such as copolymers of 50, and preferably 70 to 99 percent of vinyl chloride and, for example, about 1 to 30 percent of vinylidene chloride, vinyl esters and acrylic acid esters; or multi-component interpolymers such as those, for example, containing about 70 to 90 percent vinyl chloride, 5 to 25 percent vinylidene chloride, and 5 to 25 percent vinyl esters such as vinyl acetate, vinyl benzoate, and alkyl acrylates or alkyl methacrylates. Regardless of the particular comonomers employed, the end products of this invention are preferably obtained by employing a normally rigid vinyl halide polymer.

The vinyl halide polymers may be prepared by any of the polymerization techniques known to and employed by those skilled in the art. Such methods as solution, suspension, emulsion and the like are preferred. The polyvinyl chloride preferred for this use is preferably a hard, tough, high-molecular weight material of uniform molecular weight distribtuion and particle size, so as to take advantage of all of the excellent properties inherent in this material. The form of the vinyl halide polymer may be the solid dried product in powder or granular form; or as a suspension, solution or emulsion, as will be more fully described hereinafter.

The polymeric resinous processing aids employed to prepare the compositions of this invention are preferably styrene-acrylonitrile polymers which are compatible with the vinyl halide polymer. These resins are prepared by polymerizing a monomeric mixture consisting essentially of a styrene and an acrylonitrile. Such mixtures may also contain minor amounts of other copolymerizable monoolefinic monomers of the type hereinbefore described as minor constituents. The styrene utilized is preferably styrene itself. Other useful styrenes include alkyl styrenes such as methyl styrene, ethyl styrene; halo styrenes such as chlorostyrenes represented by monochlorostyrene and dichlorostyrenes; alkoxy styrenes and like styrene derivatives copolymerizable with acrylonitrile. Better results are obtained if the resin contains greater than 50 percent of bound styrene or is prepared from monomer mixtures containing greater than 50 weight percent of styrene. The acrylonitrile comonomer employed in the monomer mixture is preferably acrylonitrile. Other useful acrylonitriles include alkyl acrylonitriles such as methacrylonitrile and ethacrylonitrile, chloroacrylonitrile and the like, in amounts from 10 to 50 percent in the monomer mixture and resulting copolymer. The other minor monoolefinic constituents, if employed, are preferably less than 20 percent. It is preferred to use, however, polymers prepared from monomer mixtures containing about 65 to 85 weight percent of styrene and 15 to 35 weight percent of acrylonitrile. In any case the styrene-acrylonitrile polymer should be a hard, tough, high-molecular weight thermoplastic material to obtain optimum results from its use with the other components of the composition.

The styrene-acrylonitrile polymers may be prepared by any of the polymerization techniques known to and employed by those skilled in the art. Such methods as solution, suspension, emulsion and the like are preferred. The form of the resin may be the solid dried product in powder or granular form as a suspension, solution or emulsion, as will be more fully described hereinafter. The amounts of styrene-acrylonitrile polymer employed in the compositions of this invention are from 1 to 40 weight parts per 100 weight parts of polyvinyl halide. Better results are obtained when using 1 to 20 parts, and the concentration is preferably from 1 to 10 parts per 100 weight parts of the vinyl halide polymer.

The rubbery interpolymers employed in the preparation of the polymer compositions of this invention contain a butadiene-1,3 hydrocarbon, an acrylonitrile and at least one other monoolefinic monomer copolymerizable with the butadiene-1,3 hydrocarbon and acrylonitrile. The interpolymers are prepared by polymerizing monomer mixtures containing preferably 1,3-butadiene, acrylonitrile and one or more of styrene, chlorostyrenes, alkyl acrylates, alkyl methacrylates and like monoolefinic comonomers. The monoolefinic comonomers which may be copolymerized with a butadiene-1,3 hydrocarbon and acrylonitrile are well known to those skilled in the art and include such materials as preferably styrene, dichlorostyrene and the like, and also include the alkyl acrylates such as ethyl acrylate, butyl acrylate, hexyl acrylate; alkyl methacrylates such as methyl methacrylate, butyl methacrylate, octyl methacrylate; vinyl alkyl ketones such as vinyl methyl ketone; vinyl alkyl ethers such as vinyl ethyl ether, vinyl pyridine, vinyl naphthalene and the like. In general the third monomeric constituent may be a vinylidene compound containing the group $CH_2=C<$, that is, containing a terminal methylene group attached by a double bond to a carbon atom. Other butadiene-1,3 hydrocarbons such as isoprene, and other acrylonitriles such as chloroacrylonitrile may also be employed. The ratio of the monomers by weight employed may be from about 50 to 90 percent butadiene-1,3 hydrocarbon, 5 to 30 weight percent of the acrylonitrile, and 5 to 30 weight percent of the other copolymerizable monoolefinic monomers. It is preferred that only three component monomer mixtures be polymerized for the rubbery interpolymers to be used in this invention, but small amounts of other copolymerizable monoolefinic monomers as set forth above may be present in the monomer mixture. Better results are obtained when the interpolymer used is prepared from monomer mixtures containing from about 60 to 75 weight percent of 1,3-butadiene, from 10 to 20 weight percent acrylonitrile, and 10 to 20 weight percent fo another monoolefinic monomer copolymerizable with the butadiene-1,3 hydrocarbon and an acrylonitrile selected from the group consisting of styrenes, alkyl acrylates and alkyl methacrylates. A more preferred interpolymer is prepared from a monomer mixture containing 60 to 70 weight percent 1,3-butadiene, 15 to 20 weight percent acrylonitrile and 15 to 20 weight percent styrene. The polymer resulting from this monomer mixture contributes the best balance of physical properties to the compositions of this invention.

The rubbery interpolymers may be prepared by any of the polymerization techniques known to and employed by those skilled in the art, but emulsion polymerization is preferred. The interpolymer may be employed as the dry solid polymer, as a cement, dispersion, a latex and the like, and at any reasonable degree of conversion, although a conversion between 50 and 100 percent is preferred. The interpolymer is preferably polymerized to a Mooney value of about 25 to 150 ML, and interpolymer with a Mooney value of about 50 to 100 ML is more preferred. The interpolymer preferably has a low gel content to obtain optimum results.

The amount of rubbery interpolymer to be blended with the other ingredients to obtain the outstanding compositions of this invention may be varied within rather broad limits, and one is still able to obtain useful products; but if the advantages of the vinyl halide polymer are to be maintained, the amounts employed to obtain optimum results are rather critical. From 1 to 25 weight parts of interpolymer may be used per 100 parts of vinyl halide polymer and styrene-acrylonitrile polymer. Better results are obtained if 5 to 15 parts are employed, and preferably the amount is from about 10 weight parts per 100 weight parts of the other two constituents.

Unlike the composition described in the before-mentioned Jennings' application, the ingredients of this composition are not completely compatible with each other. When combined in proper proportions, the rubbery ingredient of the composition is not completely compatible with the resinous ingredients, and it is this controlled incompatibility which is believed to be responsible for the unexpected improvement in shock resistance obtained with very little loss of the initial physical properties of the resinous components. A butadiene-styrene copolymer is not compatible at all with the other two resinous materials, and the small degree of shock resistance that is obtained is at the expense of the other physical properties which are greatly degraded. In the composition of this invention, the three polymer constituents cooperate to contribute to the vastly improved impact strength and a good balance of the other desirable physical properties and processability.

In the practice of this invention the ingredients may be mixed in any order and the ingredients may be in any conventional form. One preferred method is to blend the two compatible resins, the vinyl halide polymer and the styrene-acrylonitrile polymer, by mixing the dry resin powders and then masticating with heating until a homogeneous sheet is formed. The two resinous components may also be blended in a Banbury mixer or on a plastic mill by first working one resin until a homogeneous sheet is formed, and then adding the other resin with further working unitl complete homogeneity is obtained. The intermixture of these two components may then be blended with the rubbery interpolymer in a Banbury mixer or on a plastic mill by working the rubbery interpolymer into the resinous blend. All three of the polymeric ingredients may be blended together in such mixing equipment and also by first dissolving each polymer in a mutual solvent, mixing the solutions and then precipitating the polymer blend from the mixed solutions or by taking off the solvent as by evaporation. The separate polymer ingredients may also be prepared by polymerizing in the form of dispersions or emulsions or suspensions, and then blending the suspensions or dispersions and coagulating. These methods give particularly intimate mixtures of the ingredients. Still another method is to polymerize the monomeric ingredients of one polymer, add to this the monomers of one of the others, and successively continue the polymerization so as to "overpolymerize" the second and third polymers on the particles of the first. The method employed to obtain the mixture of the three ingredients is not critical, the only requirement being that an intimate mixture of the three ingredients be obtained.

Regardless of the method by which the initial blending of the three polymers is accomplished, it is generally preferred that the blended polymers be worked or masticated under heat and pressure to insure efficient dispersion of the various ingredients in the mixture. The temperature at which the mastication is conducted is not critical and is dependent to some extent on the thermoplastic character of the two resins and the rubbery interpolymer. Unplasticized polyvinyl chloride is efficiently blended with a styrene-acrylonitrile copolymer by mastication at a temperature of about 300° F. The rubbery ingredient may be incorporated into this mixture at this or a slightly lower temperature. In general, temperatures of from about 200° to 400° F. are found to be sufficient to accomplish efficient mastication and mixing of the blended compositions containing the full range of useful and permissible proportions of vinyl halide polymer, styrene-acrylonitrile polymer, and the rubbery interpolymer.

For example, the two resins may be prepared as fine dry powders and mixed on a plastic mill with closely-set heated rolls at about 300° F. The resins fuse after a few passes, and a sheet with a smooth-rolling bank is obtained. To this mixture is added the rubbery interpolymer. About 6 passes are sufficient to obtain a good mixture. The resulting product may be extruded in pipe sections which have very smooth surfaces. The product may also be readily calendered to form very thin smooth sheets on a four-roll calender at about 350° F. The product may also be press molded, laminated, embossed, cut, drilled, machined and the like. The resulting products are rigid, shock-resistant, have good low temperature properties, good resistance to heat distortion and an excellent balance of stress-strain properties.

In the following examples will be found specific embodiments of the invention and details employed in the practice of the invention. The tests on all of the resulting samples are standard ASTM tests. All parts are parts by weight.

*Examples I through IV*

100 parts of high-molecular weight polyvinyl chloride powder and 10 parts of a resin in powder form, which is made by polymerizing in emulsion a monomer mixture containing 75 parts of styrene with 25 parts of acrylonitrile, are intimately mixed and blended. 100 parts of this resin mixture are placed in a dough-type mixer and 2 parts of a tin mercaptide stabilizer added thereto. A rubbery interpolymer having a Mooney value of 70 ML and prepared by polymerizing a monomer mixture of 67 parts of 1,3-butadiene, 16 parts of acrylonitrile, and 17 parts of styrene in a fatty acid soap emulsion at a temperature of 30° C. with potassium persulfate, is mixed with the resin mixture in four different proportions, 4, 6, 8 and 10 parts of interpolymer in separate batches with 110 parts of the resin mixture in each case. The mixture of components is worked on a close-set two-roll plastic mill at about 300° F. The resulting product is sheeted off the mill and molded in standard test molds for 5 minutes under pressure at 345° F., the molds cooled and the molded stock removed. If necessary, the samples are machined to the required tolerances. The following test results are obtained on the samples:

|  | Parts of Interpolymer | | | |
| --- | --- | --- | --- | --- |
|  | 4 | 6 | 8 | 10 |
| Tensile strength—pounds per square inch | 7,600 | 6,500 | 6,400 | 5,800 |
| Flexural strength—pounds per square inch | 14,000 | 13,000 | 13,000 | 11,000 |
| Izod impact—ft. pounds per inch of notch | 0.47 | 1.2 | 8.4 | 9.5 |

When more than about 10 parts of the interploymer are employed, more mastication is ordinarily required than with lesser amounts. These compositions process readily and may be formed into smooth-surfaced, tough, rigid, useful articles such as sheets, pipes and the like.

When Example IV is repeated with another rubbery interpolymer which is prepared by the emulsion polymerization of a monomer mixture of 67 parts of 1,3-butadiene, 16 parts of acrylonitrile and 17 parts of 2,5-dichlorostyrene of a Mooney value of about 85 ML, similar excellent results are obtained, and the resulting polymer mixture has an Izod impact value of about 9, tensile strength of about 6000 pounds per square inch with an accompanying outstanding good balance of physical properties. Similarly, when an interpolymer containing methyl methacrylate instead of dichlorostyrene is employed, useful products are obtained.

When other rigid vinyl resins, other styrene-acrylonitrile polymers and other rubbery interpolymers of the types described are similarly employed, other useful products of high impact resistance which possess a good balance of other physical properties are obtained.

Other compounding ingredients such as extenders, stabilizers, colors and the like may be employed in preparing the compositions of this invention as is well known in the art so long as the balance between impact strength, flexural strength, tensile strength, processability, heat distortion and the like are not affected to such a degree that the composition is no longer useful as a tough, hard, rigid thermoplastic product.

While we have disclosed certain preferred embodiments of the invention in the examples, we do not thereby desire or intend to limit the invention solely thereto, for as has been disclosed, the materials, proportions and methods may be varied within wide limits, and equivalents may be employed without departing from the scope and spirit of the invention as defined in the appended claims, and it is to these only that we intend to limit the invention.

We claim:

1. An improved, shock-resistant, processable, rigid, thermoplastic composition comprising an intimate mixture of (1) a rigid vinyl halide polymer of a monomeric material comprised predominately of a vinyl halide and lesser amounts of other monoolefinic monomers, (2) a hard, tough, resinous polymer of a predominately monoolefinic mixture comprising 50 to 90 weight percent of a monomer selected from the class consisting of styrene, alkyl styrenes, and chlorostyrenes and 10 to 50 weight percent of a monomer selected from the class consisting of acrylonitrile, methacrylonitrile and chloroacrylonitrile and (3) a rubbery interpolymer of a monomer mixture comprising 50 to 90 weight percent of a 1,3-butadiene hydrocarbon, 5 to 30 weight percent of an acrylonitrile and 5 to 30 weight percent of at least one other monoolefinic monomer copolymerizable with the 1,3-butadiene hydrocarbon and acrylonitrile, said thermoplastic polymeric composition containing essentially from 1 to 40 weight parts of (2) based on 100 weight parts of (1) and 1 to 25 weight parts of (3) based on 100 weight parts of (1) and (2).

2. The composition of claim 1 wherein (1) is polyvinyl chloride.

3. The improved, shock-resistant, processable, rigid, thermoplastic composition of claim 1 wherein (1) is comprised predominately of chloride with lesser amounts of other polymerized monoolefinic monomers, (2) is a copolymer of 60 to 90 weight percent of styrene and 10 to 40 weight percent of acrylonitrile and (3) is a rubbery interpolymer comprising 50 to 90 weight percent of 1,3-butadiene, 5 to 30 weight percent of acrylonitrile and 5 to 30 weight percent of a comonomer selected from the class consisting of styrene, alkyl acrylates and alkyl methacrylates, and the said composition contains essentially from 1 to 20 weight parts of (2) based on 100 weight parts of (1) and from 5 to 15 weight parts of (3) based on 100 weight parts of (1) and (2).

4. The improved, shock-resistant, processable, rigid, thermoplastic composition of claim 3 wherein (1) is a hard, tough, high-molecular weight polyvinyl chloride, (2) is a styreneacrylonitrile copolymer containing 65 to 85 weight percent of styrene and 15 to 35 weight percent of acrylonitrile, and (3) is a rubbery interpolymer prepared from a monomer mixture containing 65 to 70 weight percent of 1,3-butadiene, 15 to 20 weight percent of acrylonitrile and 15 to 20 weight percent of styrene, said composition containing from 1 to 10 weight parts of (2) based on 100 weight parts of (1) and 5 to 15 weight parts of (3) based on 100 weight parts of (1) and (2).

5. The improved, shock-resistant, processable, rigid, thermoplastic composition of claim 3 wherein (1) is a hard, tough, high-molecular weight polyvinyl chloride, (2) is a styreneacrylonitrile copolymer containing 65 to 85 weight percent of styrene and 15 to 35 weight percent of acrylonitrile, and (3) is a rubbery interpolymer prepared from a monomer mixture containing 65 to 70 weight percent of 1,3-butadiene, 15 to 20 weight percent of acrylonitrile and 15 to 20 weight percent of a chlorostyrene, said composition containing from 1 to 10 weight parts of (2) based on 100 weight parts of (1) and 5 to 15 weight parts of (3) based on 100 weight parts of (1) and (2).

6. The improved, shock-resistant, processable, rigid, thermoplastic composition of claim 3 wherein (1) is a hard, tough, high-molecular weight polyvinyl chloride, (2) is a styreneacrylonitrile copolymer containing 65 to 85 weight percent of styrene and 15 to 35 weight percent of acrylonitrile, and (3) is a rubbery interpolymer prepared from a monomer mixture containing 65 to 70 weight percent of 1,3-butadiene, 15 to 20 weight percent of acrylonitrile and 15 to 20 weight percent of an alkyl methacrylate, said composition containing from 1 to 10 weight parts of (2) based on 100 weight parts of (1) and 5 to 15 weight parts of (3) based on 100 weight parts of (1) and (2).

7. The improved, shock-resistant, processable, rigid, thermoplastic composition of claim 3 wherein (1) is a hard, tough, high-molecular weight polyvinyl chloride, (2) is a copolymer of 65 to 85 weight percent of methyl styrene and 15 to 35 weight percent of acrylonitrile, and (3) is a rubbery interpolymer prepared from a monomer mixture containing 65 to 70 weight percent of 1,3-butadiene, 15 to 20 weight percent of acrylonitrile and 15 to 20 weight percent of styrene, said composition containing from 1 to 10 weight parts of (2) based on 100 weight parts of (1) and 5 to 15 weight parts of (3) based on 100 weight parts of (1) and (2).

8. The method of improving the shock-resistance of a normally hard, tough and horny vinyl halide polymer of a monomer mixture comprised predominately of a vinyl halide and lesser amounts of other monoolefinic monomers, which method comprises mixing with 100 weight parts of the said vinyl halide polymer (1) 1 to 40 weight parts of a hard, tough, resinous polymer of a predominately monoolefinic mixture comprising 50 to 90 weight percent of a monomer selected from the class consisting of styrene, alkyl styrenes, and chlorostyrenes and 10 to 50 weight percent of a monomer selected from the class consisting of acrylonitrile, methacrylonitrile and chloroacrylonitrile and (2) 1 to 25 weight parts of a rubbery interpolymer of a polymerized mixture comprising 50 to 90 weight percent of a 1,3-butadiene hydrocarbon, 5 to 30 weight percent of an acrylonitrile and 5 to 30 weight percent of at least one other copolymerizable monoolefinic monomer in an amount 1 to 25 weight parts based on 100 weight parts of the two resinous components, and then masticating the polymer mixture while heating at a temperature from about 200° F. to about 400° F. to effect an intimate mixture of the polymeric materials.

9. An improved, shock-resistant, processable, rigid thermoplastic composition comprising an intimate mixture of (1) polyvinyl chloride, (2) a resinous copolymer containing about 75 weight percent styrene and about 25 weight percent acrylonitrile and (3) a rubbery interpolymer prepared from a monomer mixture containing about 60 to 75 weight percent 1,3-butadiene, about 10 to 20 weight percent acrylonitrile and about 10 to 20 weight percent styrene, said composition containing from about 1 to about 10 weight parts of (2) based on 100 weight parts of (1) and about 5 to about 15 weight parts of (3) based on 100 weight parts of (1) and (2).

10. An improved, shock-resistant, processable, rigid, thermoplastic composition comprising an intimate mixture of (1) polyvinyl chloride, (2) a copolymer of 50 to 90 weight percent styrene and 50 to 10 weight percent acrylonitrile and (3) a rubbery interpolymer of a monomer mixture comprising 50 to 90 weight percent of 1,3-butadiene, 5 to 30 weight percent of acrylonitrile and 5 to 30 weight percent of at least one other monoolefinic monomer copolymerizable with the 1,3-butadiene and acrylonitrile, said thermoplastic composition containing essentially from 1 to 40 weight parts of (2) based on 100 weight parts of (1) and from 1 to 25 weight parts of (3) based on 100 weight parts of (1) and (2).

References Cited in the file of this patent

UNITED STATES PATENTS

| | | |
|---|---|---|
| 2,330,353 | Henderson | Sept. 28, 1943 |
| 2,439,202 | Daly | Apr. 6, 1948 |
| 2,550,139 | Daly | April 24, 1951 |
| 2,646,417 | Jennings | July 21, 1953 |
| 2,652,384 | Sayko et al. | Sept. 15, 1953 |
| 2,713,566 | Reid | July 15, 1955 |

FOREIGN PATENTS

| | | |
|---|---|---|
| 947,162 | France | Jan. 3, 1949 |

UNITED STATES PATENT OFFICE

CERTIFICATE OF CORRECTION

Patent No. 2,808,387

October 1, 1957

Clarence E. Parks et al.

It is hereby certified that error appears in the printed specification of the above numbered patent requiring correction and that the said Letters Patent should read as corrected below.

Column 1, line 46, after "has" insert -- now --; line 51, before "halide" insert -- vinyl --; column 4, line 6, for "percent fo" read -- percent of --; line 68, for "unitl" read -- until --; column 7, line 5, before "chloride" insert -- vinyl --.

Signed and sealed this 12th day of November 1957.

(SEAL)
Attest:

KARL H. AXLINE

Attesting Officer

ROBERT C. WATSON
Commissioner of Patents